C. LE G. FORTESCUE.
CIRCUIT INTERRUPTER.
APPLICATION FILED OCT. 17, 1918.

1,427,369.

Patented Aug. 29, 1922.

WITNESSES:
J.C. Helsel.
J.M. Procter

INVENTOR
Charles Le G. Fortescue.
BY
Wesley G. Carr
ATTORNEY

UNITED STATES PATENT OFFICE.

CHARLES LE G. FORTESCUE, OF PITTSBURGH, PENNSYLVANIA, ASSIGNOR TO WESTINGHOUSE ELECTRIC & MANUFACTURING COMPANY, A CORPORATION OF PENNSYLVANIA.

CIRCUIT INTERRUPTER.

1,427,369.      Specification of Letters Patent.     Patented Aug. 29, 1922.

Application filed October 17, 1918. Serial No. 258,579.

*To all whom it may concern:*

Be it known that I, CHARLES LE G. FORTESCUE, a subject of the King of Great Britain, and a resident of Pittsburgh, in the county of Allegheny and State of Pennsylvania, have invented a new and useful Improvement in Circuit Interrupters, of which the following is a specification.

My invention relates to circuit interrupters, and it has for its object to provide an operating electromagnet for such devices that shall be simple and inexpensive to construct and quickly responsive to predetermined circuit conditions.

In practicing my invention, I provide a core member of substantially rectangular shape having an air gap in one side thereof, an armature for normally bridging the air gap to hold the interrupter in its closed position, a potential winding for energizing the core member, and windings disposed on the core member in such position that, when they are energized in anticipation of an overload on the circuit, magnetic flux is prevented from traversing the armature to thus permit the same to be quickly moved by a spring to such position as to open the interrupter. By this arrangement, the interrupter may be opened in a minimum period of time because it is not necessary to oppose the flux tending to hold the armature in its closed position but merely to divert it through a convenient path comprising the air gap.

Figure 1:
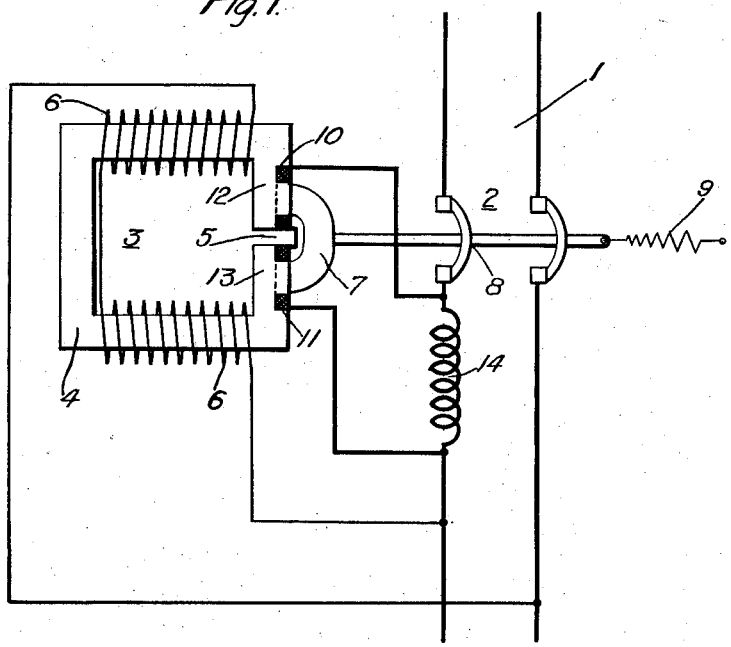
Figure 2:
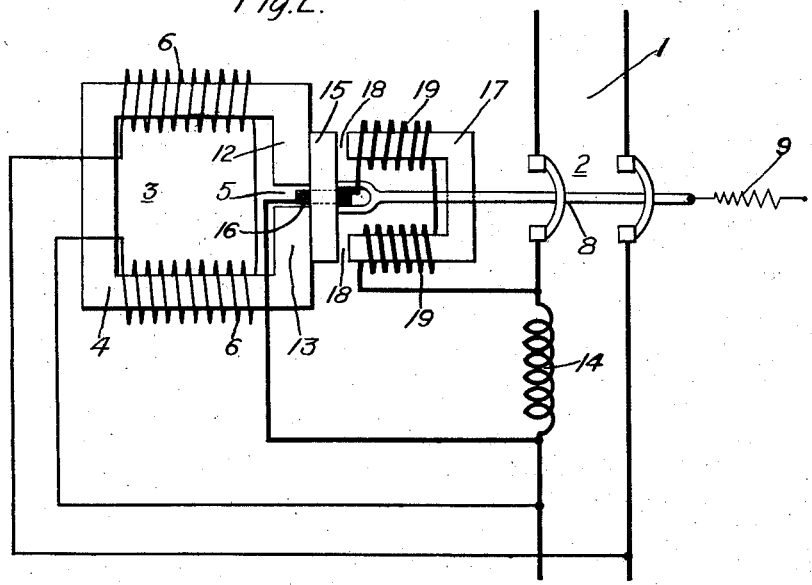

In the accompanying drawing, Figure 1 is a diagrammatic view of a circuit interrupter embodying my invention, and Fig. 2 is a diagrammatic view of a circuit interrupter embodying a modified form of my invention.

A direct-current circuit 1 is provided with a circuit interrupter 2 that is actuated and controlled by an electromagnetic device 3.

The electromagnetic device 3 comprises a magnetizable core member 4 of substantially rectangular shape having an air gap 5 in one side thereof. Potential windings 6 are adapted to energize the core member 4 and are connected in shunt relation to the circuit 1. The armature 7 of the device 4 is directly connected to the movable member 8 of the interrupter 2 and is normally adapted to hold the interrupter closed against the action of a spring 9. Two windings 10 and 11 are disposed in the faces of the legs 12 and 13 of the core member 4 in such positions that they surround the ends of the armature 7. The coils 10 and 11 are series connected across the terminals of a reactor 14 that is connected in series with the circuit 1. The windings 10 and 11 are so connected that, when they are energized, they prevent magnetic flux from the legs 12 and 13 from traversing the armature 7.

Under normal conditions, the drop of potential across the reactor 14 is insufficient to energize the windings 10 and 11, but when a ground or short circuit occurs on the circuit 1 the rush of current will cause a relatively large drop of potential across the reactor 14 which will so energize the windings 10 and 11, before the rush in current reaches a destructive value, as to permit the armature 7 to become de-magnetized and the flux induced by the winding 6 to be diverted from the armature 7 to the path through the legs 12 and 13 and across the air gap 5. This permits the spring 9 to quickly open the interrupter 2, since the windings 10 and 11 do not oppose the flow of magnetic flux but merely divert the same from one path to another.

In Fig. 2 of the drawings, the armature 15 of the device 3 is normally disposed adjacent the air gap 5 between the legs 12 and 13 of the core member 4, and a winding 16 is disposed therearound for purposes to be hereinafter set forth. A core member 17 of substantially U-shape is separated from the armature 15 by air gaps 18 and is provided with a winding 19 that is connected in series with the winding 16, the circuit, thus constituted, being connected across the reactor 14. The device shown in Fig. 2 of the drawing is, in other respects, similar to that shown in Fig. 1 of the drawings, and similar parts are designated by the same reference numerals.

The winding 16 is so connected that, when sufficient potential is impressed across the reactor 14, it will oppose the normal flow of magnetic lines between the legs 12 and 13 through the armature 15, but will assist the flow of magnetic lines that are set up by the winding 19 in the core member 17. That is, when a sudden overload occurs on the circuit 1, the magnetic flux of the core member 4 will be diverted, in anticipation of the overload 1, through the air gap 5, and the armature 15 will be actuated by the spring 9, which is assisted by the winding 19, to positively open the interrupter in a minimum period of time.

My invention is not limited to the specific structure illustrated, as it may be variously modified without departing from the spirit and scope of the invention as set forth in the appended claims.

I claim as my invention:

1. In an electric circuit, the combination with an interrupter, of a magnetizable core member having an air gap therein, a potential winding for energizing the core member, an armature directly connected to the movable member of the interrupter and adapted to normally complete the magnetic circuit of the core member, and a winding connected to the circuit and so disposed around portions of the core member, circumferentially of those portions of its surface which are engaged by the armature, as to deflect the magnetic flux of the core member through the air gap to permit the interrupter to be opened quickly, under predetermined conditions.

2. An electromagnet comprising a core member having an air gap therein, an armature for normally bridging the air gap, means for energizing the core member, means for actuating the armature away from the core member, and a winding disposed around a portion of the core member, adjacent to that portion of its surface that is engaged by the armature, for deflecting the flux from the armature across the air gap, under predetermined conditions.

3. In an electric circuit, the combination with an interrupter, of a magnetizable core member having an air gap therein, a potential winding for energizing the core member, an armature directly connected to the movable member of the interrupter and adapted to normally complete the magnetic circuit of the core member, and a winding connected to the circuit and so disposed around portions of the core member as to deflect the magnetic flux of the core member through the air gap to permit the interrupter to be opened quickly under predetermined conditions.

4. In an electric circuit, the combination with an interrupter, of a magnetizable core member having an air gap therein, a potential winding for energizing the core member, an armature directly connected to the movable member of the interrupter and adapted to normally complete the magnetic circuit of the core member, and a winding connected to the circuit and so disposed around portions of the core member as to deflect the magnetic flux of the core member through the air gap to permit the interrupter to be opened quickly in anticipation of an overload on the circuit.

5. The combination with an electric circuit, of a core member of substantially rectangular shape having an air gap therein, an armature for normally bridging the air gap, means connected to the circuit for energizing the core member, and a winding disposed in the face of the core member, circumferentially of that portion of its surface which is engaged by the armature, and so connected to the circuit that it is energized to prevent the magnetic flux from the core member traversing the armature when the current in the circuit changes quickly.

6. An electromagnet comprising a core member having an air gap therein, an armature for normally bridging the air gap, means for energizing the core member, means for actuating the armature away from the core member, and a winding disposed about a portion of the core member that is engaged by the armature for deflecting the flux from the armature across the air gap, under predetermined conditions.

7. The combination with an electric circuit, of a core member of substantially rectangular shape having an air gap therein, an armature for normally bridging the air gap, means connected to the circuit for energizing the core member, and a winding disposed in that face of the core member which is engaged by the armature and so connected to the circuit that it is energized to prevent the magnetic flux from the core member traversing the armature when the current in the circuit changes quickly.

In testimony whereof, I have hereunto subscribed my name this 26th day of Sept., 1918.

CHARLES LE G. FORTESCUE.